US010909166B1

(12) United States Patent
Bogazzi (10) Patent No.: US 10,909,166 B1
(45) Date of Patent: Feb. 2, 2021

(54) REVERSE SEARCH WITH MANUAL COMPOSITION

(71) Applicant: SHUTTERSTOCK, INC., New York, NY (US)

(72) Inventor: Andrea Bogazzi, Rome (IT)

(73) Assignee: Shutterstock, Inc., New York, NY (US)

(*) Notice: Subject to any disclaimer, the term of this patent is extended or adjusted under 35 U.S.C. 154(b) by 547 days.

(21) Appl. No.: 15/803,578

(22) Filed: Nov. 3, 2017

(51) Int. Cl.
*G06F 16/50* (2019.01)
*G06F 16/532* (2019.01)
*G06K 9/62* (2006.01)
*G06K 9/20* (2006.01)
*G06F 16/583* (2019.01)

(52) U.S. Cl.
CPC ........ *G06F 16/532* (2019.01); *G06F 16/5838* (2019.01); *G06K 9/2081* (2013.01); *G06K 9/6231* (2013.01)

(58) Field of Classification Search
CPC .................................................... G06F 16/583
See application file for complete search history.

(56) References Cited

U.S. PATENT DOCUMENTS

| 8,438,163 B1* | 5/2013 | Li | G06K 9/00536 |
| | | | 707/737 |
| 2009/0089254 A1* | 4/2009 | Von Kaenel | G06Q 40/08 |
| 2009/0327284 A1* | 12/2009 | Kataoka | G06F 16/93 |
| 2015/0178786 A1* | 6/2015 | Claessens | G06F 16/901 |
| | | | 705/14.66 |
| 2016/0004700 A1* | 1/2016 | Gao | H04L 67/02 |
| | | | 707/728 |
| 2017/0017668 A1* | 1/2017 | Steinlauf | G06F 16/3329 |
| 2017/0178335 A1* | 6/2017 | Pavani | G06T 1/0007 |
| 2017/0185869 A1* | 6/2017 | Dua | G06K 9/52 |
| 2017/0249367 A1* | 8/2017 | Bergsma | G06F 3/0482 |
| 2017/0255653 A1* | 9/2017 | Zhu | G06K 9/52 |

* cited by examiner

*Primary Examiner* — Mohammad S Rostami
(74) *Attorney, Agent, or Firm* — McDermott Will & Emery LLP (57) ABSTRACT

Various aspects of the subject technology relate to systems, methods, and machine-readable media for reverse search with manual composition. A system generates a first search result associated with a forward image search that is responsive to a search query from a client device, and each image in the first search result respectively includes a base layer that includes a representation of a first composition for the image. The system may receive user input indicating a target composition defined by the base layer of at least one image from the first search result and an object layer that indicates adjustments to the first composition of the base layer, and generates a second search result using the target composition. The second search result includes second images that respectively include a representation of a second composition that corresponds to the target composition. The system provides the second search result to the client device.

19 Claims, 6 Drawing Sheets

REVERSE SEARCH WITH MANUAL COMPOSITION

BACKGROUND

Field

The present disclosure generally relates to a computer-operated image retrieval system, and more particularly to reverse search with manual composition.

Description of the Related Art

When a user performs a search of a collection of items using a search query, an information retrieval (IR) system commonly matches a user's search terms with content items from the collection that are most relevant to a user's query. The problem of finding a desired multimedia item in a very large collection can be quite daunting. With potentially hundreds of millions of items, the task for the IR system of indicating to a user the item (e.g., image or images) that closely matches the composition within the item that the user had in mind is challenging.

SUMMARY

The present disclosure includes compositional search refinement, where a user can describe a scene or layout as a compositional input and initiate refinement of an existing image search result and/or initiate a new search directly based on the compositional input. For example, the compositional search may be used to initiate a new search for images that match the compositional input and/or filter an existing search result for existing images that match the compositional input. The compositional search can be facilitated by a user interface that enables the user to specify a composition for an image. The user interface can be used to allow a user to design over an image to refine the search for images that match the desired composition. The user interface can also allow the user to add elements over an existing image, and initiate a reverse search for new images or filter through existing image results that match that composition. For example, a representation of a "moon in the sky" can be added as a white circle via an input section of the user interface, and a reverse search for images that have that element with a higher priority than the background image can be initiated. In some aspects, the manual composition can include adding masks over the image to disable a region of the image that a user may not be interested in, or add underlining (or circling) to regions of the image identified to be important to the user.

According to one embodiment of the present disclosure, a computer-implemented method is provided. The method includes receiving, from a client device, first user input identifying a search query for content. The method includes initiating a forward image search responsive to the search query to identify one or more images from a collection of images. The method includes providing a first search result associated with the forward image search to the client device, in which each image in the first search result includes a base layer that includes a representation of a first composition for the image. The method includes receiving, from the client device, second user input indicating a target composition, in which the target composition is defined by the base layer of at least one image from the first search result and an object layer that indicates one or more adjustments to the first composition of the base layer. The method includes initiating a reverse image search using the target composition. The method also includes providing a second search result associated with the reverse image search, in which at least one image of the second search result includes a representation of a second composition that corresponds to the target composition.

According to one embodiment of the present disclosure, a system is provided including one or more processors and a computer-readable storage medium coupled to the one or more processors, the computer-readable storage medium including instructions. The instructions, when executed by the one or more processors, cause the one or more processors to generate a first search result associated with a forward image search, the first search result including a first listing of images that is responsive to a search query from a client device, in which each image in the first listing of images respectively includes a base layer that includes a representation of a first composition for the image. The instructions, when executed by the one or more processors, cause the one or more processors to receive, from the client device, user input indicating a target composition, in which the target composition is defined by the base layer of at least one image from the first search result and an object layer that indicates one or more adjustments to the first composition of the base layer. The instructions, when executed by the one or more processors, cause the one or more processors to generate a second search result using the target composition, in which the second search result includes one or more second images that respectively include a representation of a second composition that corresponds to the target composition. The instructions, when executed by the one or more processors, also cause the one or more processors to provide the second search result to the client device.

According to one embodiment of the present disclosure, a non-transitory computer readable storage medium is provided including instructions that, when executed by a processor, cause the processor to perform a method. The method includes receiving, from a client device, first user input identifying a search query for content. The method includes initiating a forward image search responsive to the search query to identify one or more images from a collection of images. The method includes providing a first search result associated with the forward image search to the client device, in which each image in the first search result includes a base layer that includes a representation of a first composition for the image. The method includes receiving, from the client device, second user input indicating a target composition, in which the target composition is defined by the base layer of at least one image from the first search result and an object layer that indicates one or more adjustments to the first composition of the base layer. The method includes initiating a reverse image search using the target composition. The method also includes providing a second search result associated with the reverse image search, in which at least one image of the second search result includes a representation of a second composition that corresponds to the target composition.

According to one embodiment of the present disclosure, a system is provided that includes means for storing instructions, and means for executing the stored instructions that, when executed by the means, cause the means for executing to perform a method. The method includes receiving, from a client device, first user input identifying a search query for content. The method includes initiating a forward image search responsive to the search query to identify one or more images from a collection of images. The method includes providing a first search result associated with the forward image search to the client device, in which each image in the first search result includes a base layer that includes a representation of a first composition for the image. The method includes receiving, from the client device, second user input indicating a target composition, in which the target composition is defined by the base layer of at least one image from the first search result and an object layer that indicates one or more adjustments to the first composition of the base layer. The method includes initiating a reverse image search using the target composition. The method also includes providing a second search result associated with the reverse image search, in which at least one image of the second search result includes a representation of a second composition that corresponds to the target composition.

According to one embodiment of the present disclosure, a computer-implemented method is provided. The method includes receiving user input via an application on a client device to initiate a forward image search. The method includes generating, in response to the received user input, a first search query for one or more images. The method includes providing for transmission the search query over a connection to a server. The method includes receiving a first search result associated with the forward image search from the server, in which the first search result is obtained by an image search service of the server responsive to the first search query, and each image in the first search result includes a base layer that includes a representation of a first composition for the image. The method also includes providing for transmission an indication of a target composition over the connection to the server, in which the target composition is defined by the base layer of at least one image from the first search result and an object layer that indicates one or more adjustments to the first composition of the base layer. The method also includes receiving a second search result associated with a reverse image search from the server, in which at least one image of the second search result including a representation of a second composition that corresponds to the target composition.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

A very common workflow for a user of an image retrieval (IR) system is beginning with a mental conception of an ideal image for a particular purpose. The user then issues a textual query to the IR system where the query is intended to capture in words their mental conception. The IR system then returns a set of images, at which point the user browses through the images, many of which are likely irrelevant, hoping to find one that is relevant. Composition is often an important factor in identifying a relevant image. Moreover, it is distracting to users to look at entire images when the factor they care about may be a certain composition of the image.

The disclosed system addresses a problem in the traditional IR systems, discovery of the most relevant images by composition, which is a problem specifically arising in the realm of computer technology, by providing a solution also rooted in computer technology, namely, by considering a search engine system using an object classifier for classifying salient objects in images using a salient map of the images and identifying these salient objects in image search results. The object classifier can classify the strength with which an image exhibits certain known objects and/or composition. The system may use an algorithm that detects the set of objects from a set of example images, referred to as training data. The disclosed system includes training of a series of computer-operated neural networks, such as a convolutional neural network, to teach the neural network to identify features of images mapping to certain object classes for identifying those images with a particular composition that are responsive to an input search query. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, and then process those features against a number of object classes. The disclosed system produces a set of vectors representing the object classifications for the corpus of images in the training data. The objects are learned from running the convolutional neural network over a corpus of the training data. The trained convolutional neural network can provide a probability distribution where each data point in the distribution corresponds to likelihood that the image includes a corresponding object. Once the convolutional neural network has been trained to predict probabilistically which features of the training images identify certain object classes, the disclosed system generates metadata for each example image indicating the composition of the image, including additional metadata that may indicate one or more salient objects and respective locations within the image. In this respect, the disclosed system can then modify the original search results by either filtering through the existing search result images and/or initiating a new search for images that match the desired compositional input.

The subject system provides several advantages including providing filtered images and/or classified images that identify a composition, or a portion thereof, that matches the compositional input. The subject system may provide a machine learning capability where the system can learn from a content item and associated objects in order to refine search results with highly relevant content items that match a compositional input. In this regard, the refined search results would yield content items with features that constitute a composition that matches the compositional input to facilitate the user's ability to filter through the search results. With this approach, the system can continually improve its accuracy (and keep up with trending differences of what certain desirable compositions look like) by incorporating user interaction data into its convolution-based compositional model.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which images contain certain compositions. At runtime, the search query produces a search space that includes items representing different compositions that correlate to a compositional input based on the original search results, thus reducing the cost of images provided for display (i.e., less bandwidth resources). Given that the subject system continues to learn and refine itself to match user preferences from a search query, modifying search results in real-time to identify the most closely matched image compositions in a listing of images reduces the system latency due to a lesser amount of time needed for a user to locate a desired image composition.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

Figure 1:
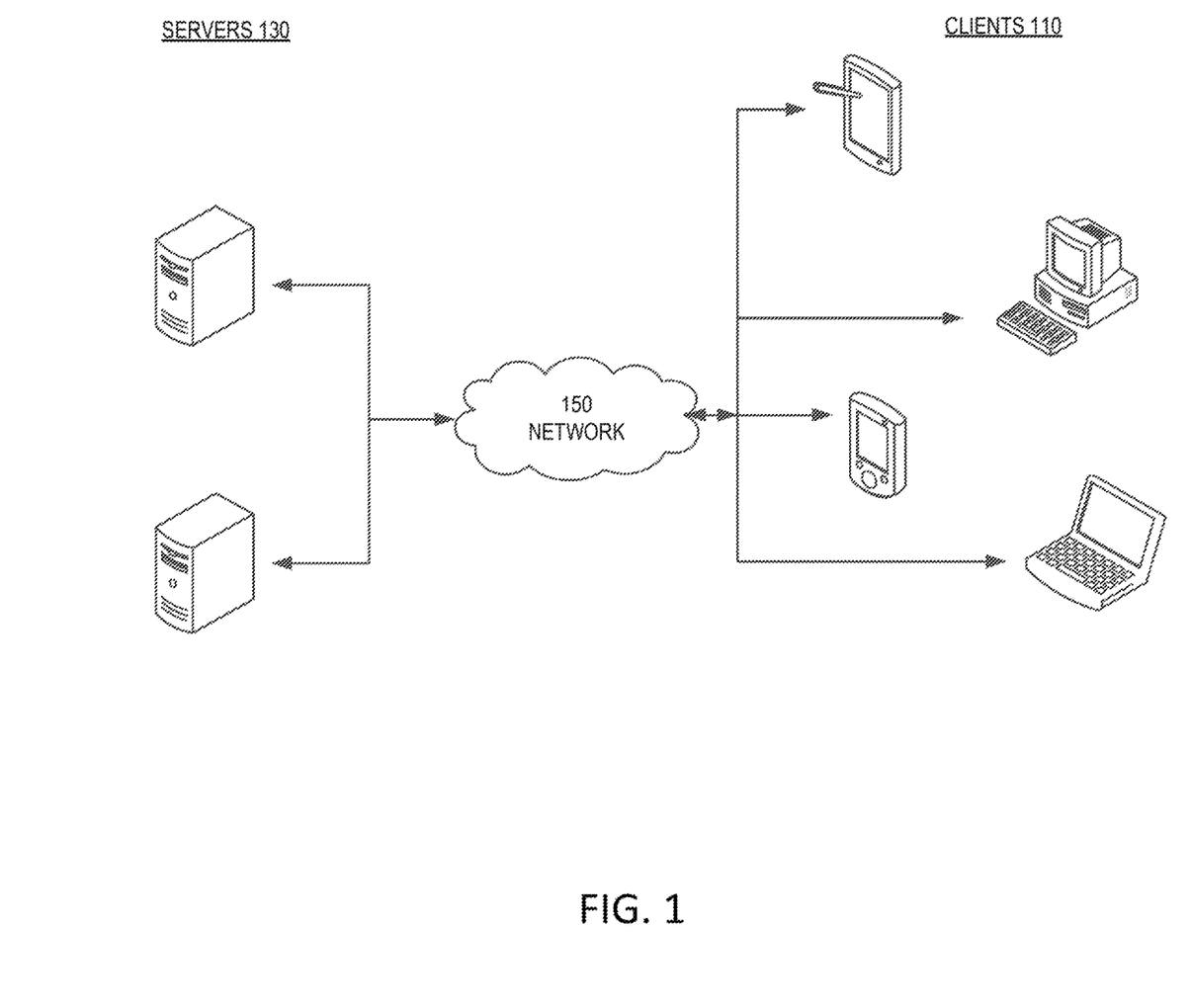
FIG. 1 illustrates an example architecture for reverse search with manual composition suitable for practicing some implementations of the disclosure.

FIG. 1 illustrates an example architecture 100 for reverse search with manual composition suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to constitute compositions for the images. The servers 130 can return images tagged with metadata indicating certain compositions (including an arrangement of foreground and background objects) within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Reverse Search With Manual Composition System

Figure 2:
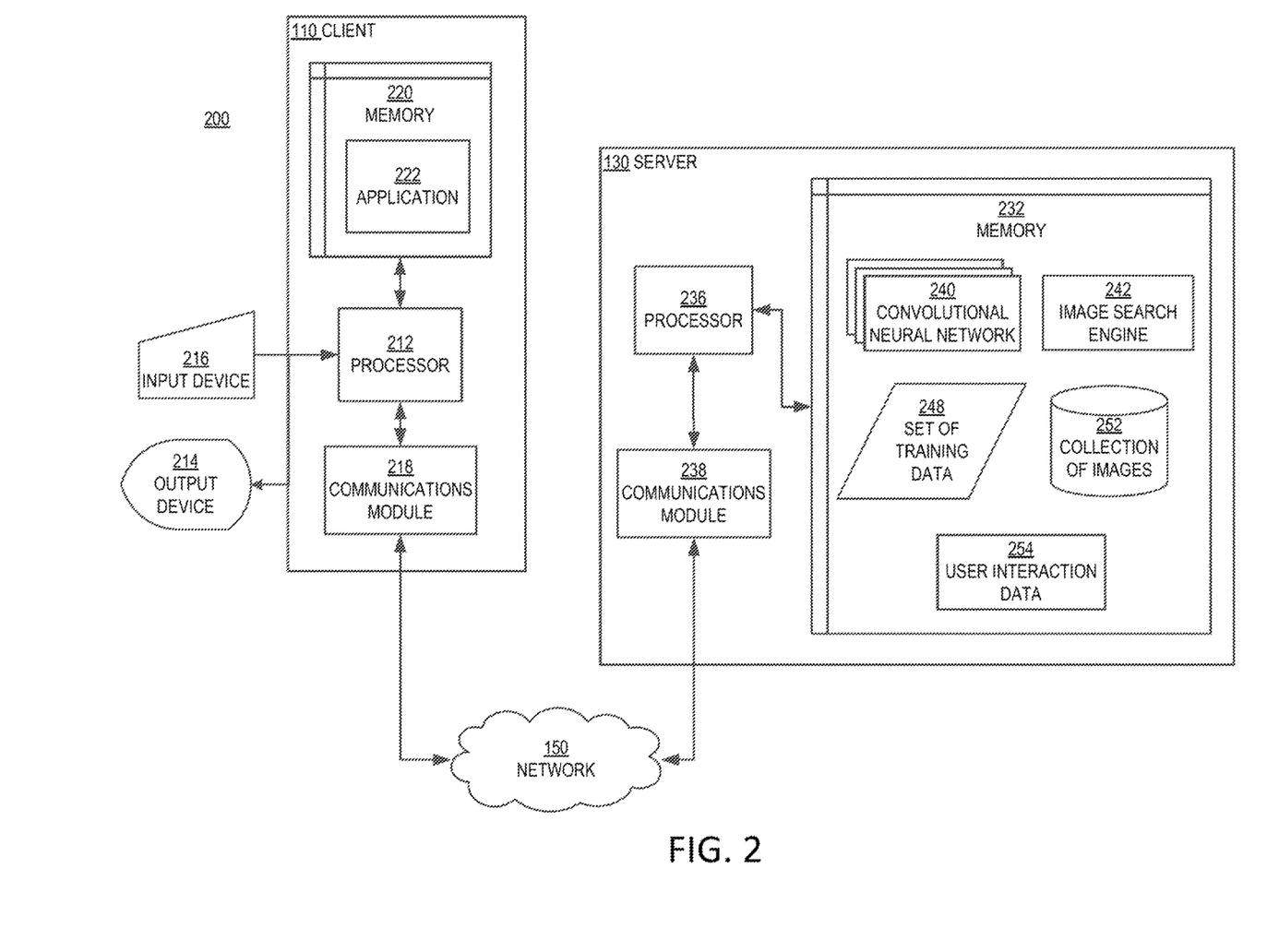
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240 and an image search engine 242.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 can include a loss layer (e.g., softmax or hinge loss layer) to back propagate errors so that the convolutional neural network 240 learns and adjusts its weights to better fit provided image data. In one or more implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height×width), and produce an output tensor (e.g., batch size×number of new feature maps×new height×width). Examples of the spatial operator layer may include convolution, average pool, max pool, etc. The average-over-width-height layer may be configured to receive an input tensor of the configuration (e.g., batch size×number of feature maps×height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes).

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. Each of the images in the collection of images 252 may include a base layer that includes a representation of an original composition for the image. The original composition may include an arrangement of foreground objects and/or background objects. The base layer may include metadata that identifies one or more objects and their corresponding locations within the original composition. In some aspects, the collection of images 252 may include images that include a base layer and an object layer that overlays the base layer. The object layer may indicate one or more adjustments to the original composition of the base layer. For example, the object layer may indicate a color variation to the base layer, mask out objects from the base layer, and/or add objects by manual drawings corresponding to user input.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. In one or more implementations, each object class corresponds to a particular image composition. The set of training data 248 may include multiple instances (or sets) of training data, where at least one instance (or set) of training data is associated with an intended object class. For example, the set of training data 248 may include images that include features that represent positive instances of a desired class so that the convolutional neural network 248 can be trained to distinguish between images with a feature of the desired class and images without a feature of the desired class. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on compositional input from users. For example, the processor 236 may determine that a user interacted with an image from a search result, such as, by selecting a segment (or region) of the image for masking, or adding an object via a manual drawing on the image, or the like. The processor 236 may keep track of the user interactions with a number of images over a given time period. The interaction history 254 may also include data indicating search behavior (and/or patterns) relating to prior image search queries.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts (e.g., tree, moon, birds, etc.) to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

In certain aspects, the processor 236 of the server 130 is configured to receive a user input from a user. The user input identifies a search query in a given natural language (e.g., English). However, the search query may be provided in a natural language other than the English language depending on implementation such that the image search engine 242 is configured to process search queries in any arbitrary natural language. A user of the client 110 may use the input device 216 to submit a search term or phrase via a user interface of the application 222. In some aspects, the search query may be provided by a manually-entered user drawing, by a voice recognition command, by a visual recognition command, or other machine-learned input command. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part).

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. The image search engine 242 initiates a forward image search based on the search request, where the image search engine 242 searches for images from the collection of images 252 that closely correspond to the search terms of the search request.

The processor 236 then receives an identification of a plurality of images from the collection of images 252 that are responsive to the search query, and is configured to provide an initial listing of images. The initial listing of images may be prioritized (or ranked), for example, by the processor 236 of the server 130 being configured to submit a set of training images (e.g., the set of training data 248) to the convolutional neural network 240 prior to the search query being received. The processor 236 may then provide the initial listing of images to the application 222 on the client 110 over the network 150 for display by an output device 214 of the client 110.

In one or more implementations, each of the searched images includes a base layer that includes a representation of a composition for the image. In this respect, the searched images have compositions that correspond to the search request. However, the searched images may have compositions with varying degrees of differences from a desirable composition and, thus, it may be desirable to enable the user to supply a compositional input such that the searched images can be filtered and/or a new search can be initiated to yield images with compositions that closely match the desirable composition.

The processor 236 of the server 130 then receives a second user input indicating a target composition. In one or more implementations, the target composition is defined by the base layer of at least one image from the first search result and an object layer that indicates one or more adjustments to the composition of the base layer. In some aspects, the object layer is superimposed (or overlaid) on the base layer such that representations of objects in the object layer appear as foreground objects relative to the base layer, and representations of objects in the base layer appear as background objects relative to the object layer. In some aspects, the processor 236, using the image search engine 242, processes the object layer in combination with the base layer of the image to generate a new composite layer that is a representation of a modified image. The features of the modified image are then used to either initiate a reverse image search and/or filter out images of the existing search result.

In one or more implementations, the object layer includes a representation of a mask layer that obscures at least a portion of the representation of the composition in the base layer. For example, the user may use the input device 216 to identity a region of the composition provided for display on the client 110, and provide a selection of the identified region that serves as the mask layer to filter out any representation of objects that may reside within the selection. The representation of objects obscured by the mask layer are then excluded from any reverse image search and/or filtration of an existing search result.

In one or more implementations, the object layer includes a representation of one or more objects that overlap at least a portion of the representation of the composition in the base layer. In some aspects, the representation of the one or more objects can serve as additional content that is added to the image relative to the representation of the composition in the base layer. For example, the user may use the input device 216 to provide a manual drawing of a tree and birds to an image that includes a representation of two people standing in an open outdoor area. In this respect, the tree and the birds are added as objects to the object layer of which in combination with the base layer now represents a target composition that serves as a new search query for images that include features corresponding to the target composition.

In one or more implementations, the object layer includes a representation of one or more objects of the base layer with an adjustment to one or more properties of the one or more objects. For example, the object layer may be used to modify several parameters of objects found in the base layer including, but not limited to, color, brightness, contrast, and the like. In this respect, the object layer may serve as a color filter to the base layer such as by modifying a color matrix of the objects in the base layer. In some aspects, the object layer includes metadata that indicates the adjustments to the properties of objects in the base layer.

The image search engine 242 can update the original search result by initiating a new search such as a reverse image search using both the base layer and object layer as search input. In this respect, the reverse image search may be based on a priority of the base layer relative to a priority of the object layer. In one or more implementations, the base layer includes a first priority and the object layer includes a second priority different from the first priority. For example, the priority applied to the object layer may be greater than the priority applied to the base layer such that images with a composition that correspond more to the object layer are given greater weight. The processor 236, using the image search engine 242, may determine whether the second priority is greater than the first priority. In some aspects, the image search engine 242 determines at least one image from the collection of images that has a composition that corresponds more to the object layer than the base layer when it is determined that the second priority is greater than the first priority. In other aspects, the image search engine 242 determines at least one image from the collection of images that has a composition that corresponds more to the base layer than the object layer when it is determined that the second priority is not greater than the first priority.

In some aspects, the object layer may include metadata that indicates weight values and/or priority values applied to respective representations of objects in the object layer. The weight/priority values may be manually assigned by the user in some implementations, or may be automatically applied by an algorithm-based process associated with the image search engine 242 in other implementations.

In one or more implementations, the user input may include a plurality of object layers, where each object layer indicates different adjustments to the base layer. For example, a first object layer may include a representation of the mask layer and a second object layer may include a representation of objects being added relative to the base layer. In this respect, the base layer may include a first priority, the first object layer may include a second priority, and the second object layer may include a third priority. In one or more implementations, the second priority and the third priority are respectively greater than the first priority, and the third priority is different from the second priority. The processor 236, using the image search engine 242, may determine whether the third priority is greater than the second priority. In some aspects, the image search engine 242 determines at least one image from the collection of images that has a composition that corresponds more to the second object layer than the first object layer when it is determined that the third priority is greater than the second priority. In other aspects, the image search engine 242 determines at least one image from the collection of images that has a composition that corresponds more to the object layer than the second object layer when it is determined that the third priority is not greater than the second priority.

The processor 236, using the image search engine 242, initiates a reverse image search using the target composition. The reverse image search may use feature descriptors from the target composition to drive the search for images that include a composition that closely matches the target composition. Depending on the priorities assigned via the object layer, images with certain compositions may be prioritized according to the type of filtration. For example, the reverse image search may prioritize images that include compositions depicting the added objects higher than images that include compositions excluding certain objects or features. The processor 236, using the image search engine 242, then provides a second search result associated with the reverse image search. In this respect, at least one image of the second search result includes a representation of a second composition that corresponds to the target composition. The second search result may include a prioritized listing of images based on the priorities defined by the object layer, where images with a composition defined by the mask layer are ranked higher than images with a composition defined by added objects, or other arbitrary ranking order depending on implementation.

At runtime, the client 110 can receive user input using the input device 216 via the application 222 on the client 110 to initiate a forward image search. The application 222 generates, in response to the received user input, a first search query for one or more images. The client 110 provides for transmission the search query over a connection to the server 130. The client 110 receives a first search result associated with the forward image search from the server 130. In some aspects, the first search result is obtained by the image search engine 242 of the server 130 in response to the first search query. In some aspects, each image in the first search result includes a base layer that includes a representation of a first composition for the image. The client 110 then provides for transmission an indication of a target composition over the connection to the server 130. In some aspects, the target composition is defined by the base layer of at least one image from the first search result and an object layer that indicates one or more adjustments to the first composition of the base layer. For example, the object layer may mask out objects in the base layer, add objects relative to the base layer, and/or modify parameters of objects in the base layer. The client 110 then receives a second search result associated with a reverse image search from the server 130. In some aspects, at least one image of the second search result includes a representation of a second composition that corresponds to the target composition.

Figure 3:
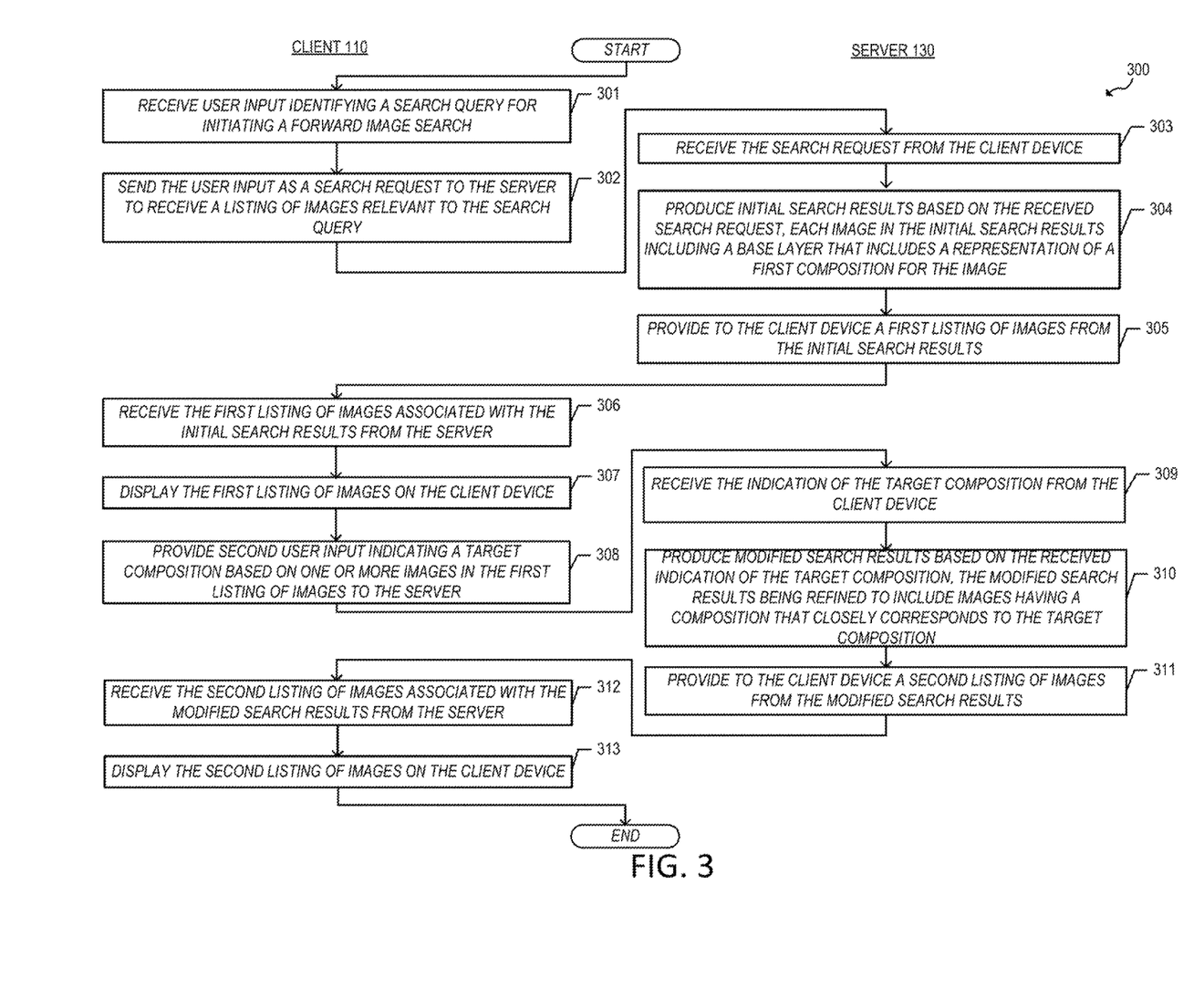
FIG. 3 illustrates an example process for reverse search by manual composition using the example client and server of FIG. 2.

FIG. 3 illustrates an example process 300 for content search by relevance feedback using the example client and server of FIG. 2. The process 300 begins in step 301 when a user, for example, loads an application 222 on a client 110 and the client 110 receives an input from the user using the input device 216 for a search query to initiate a forward image search through a collection of images 252. The input identifies one or more search terms in a given natural language for initiating the image search. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms as part of a text-based search query via a user interface of the application 222.

Next, in step 302, the application 222 on the client 110 sends the user input as a search request to the server 130 in order to receive a listing of images responsive to the text-based search query. Turning to the server 130, in step 303, the server 130 receives the search request for a listing of images from the client 110.

Subsequently, in step 304, the server 130 can determine one or more image identifiers corresponding to the search query to produce initial search results based on the received search request. For example, the search query (or request) may indicate a search term or phrase "woman and man standing on hill near tree", and hence, the server 130 may determine an image identifier associated with the search term "woman and man standing on hill near tree." In one or more implementations, the server 130 determines a collection of images associated with the one or more image identifiers. For example, the image identifier may be associated with a cluster of images that contain content relevant to the search term "woman and man standing on hill near tree." In some aspects, each image in the initial search results includes a base layer that includes a representation of a first composition for the image.

Next, in step 305, the server 130 provides to the client 110 a first listing of images from the initial search results. Turning back to the client 110, in step 306, the client 110 receives the first listing of images associated with the initial search results from the server 130. Subsequently, in step 307, the client 110 displays the first listing of images on a display device of the client 110.

Next, in step 308, the client 110 provides second user input indicating a target composition based on one or more images in the first listing of images to the server 130.

Turning back to the server 130, in step 309, the server 130 receives the indication of the target composition from the client 110.

Subsequently, in step 310, the server 130 produces modified search results based on the received indication of the target composition. In one or more implementations, the modified search results are refined to include images having a composition that closely corresponds to the target composition.

Next, in step 311, the server 130 provides to the client 110 a second listing of images from the modified search results. Turning back to the client 110, in step 312, the client 110 receives the second listing of images associated with the modified search results from the server 130. Next, in step 313, the second listing of images is provided for display via the application 222 of the client 110.

Figure 4A:
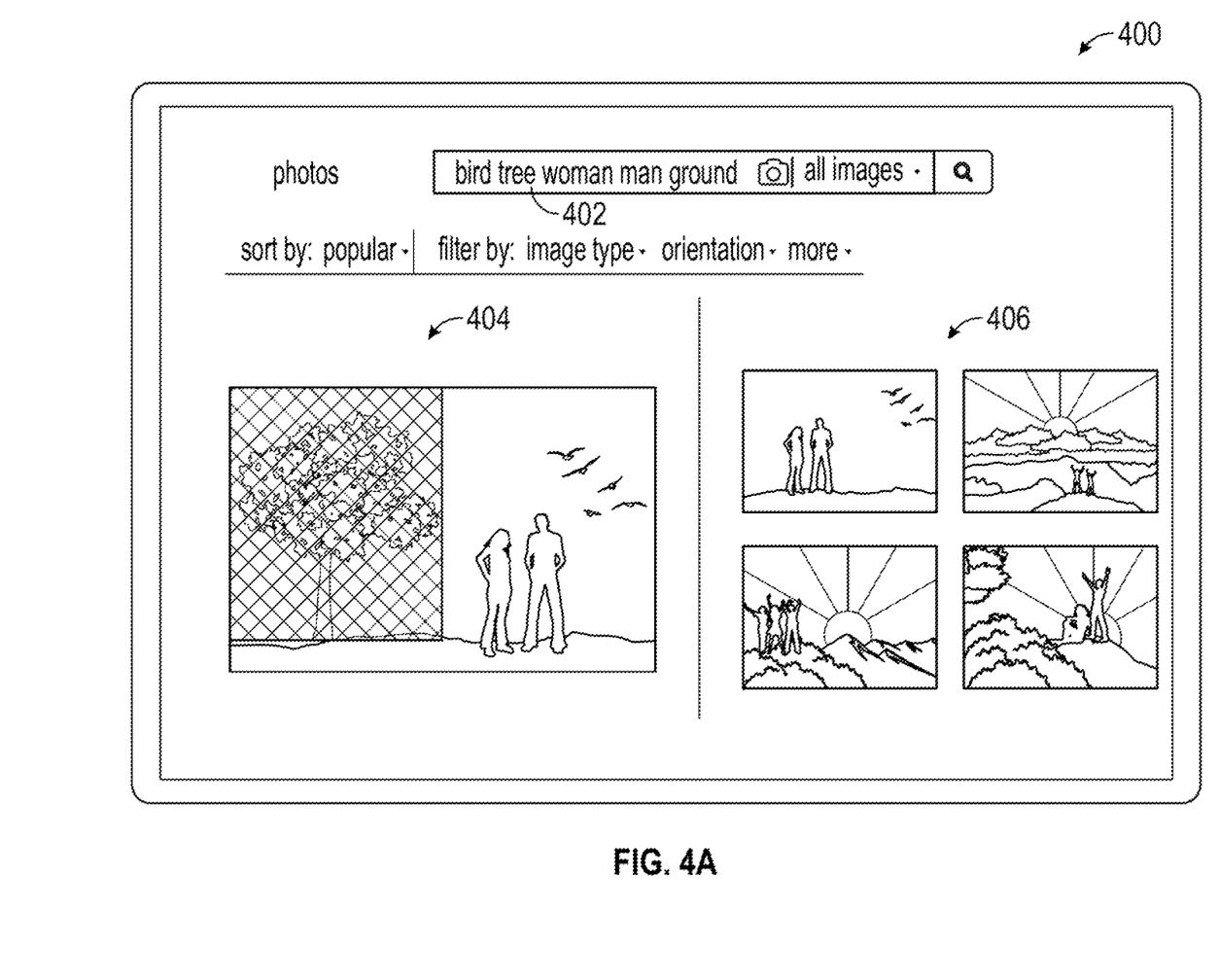
FIGS. 4A and 4B illustrate examples of a user interface for practicing the example process of FIG. 4.

FIG. 4A illustrates an example of a user interface 400 for practicing the example process of FIG. 3 via the application 222 of the client 110. In one or more implementations, the user interface 400 includes an input search query 402 and an input section 404. The processor 236, using the image search engine 242, can obtain a vector for each of the representations of "bird", "tree", "woman", "man" and "ground". The processor 236, using the image search engine 242, initiates a forward image search using the vector indicating each of the search terms, and produces a first search result (not shown) that includes an initial listing of images based on the search phrase "bird tree woman man ground." The first search result can be provided for display on an output section 406 of the user interface 400. In some aspects, each image in the first search result includes a base layer that includes a representation of a first composition for the image.

As shown in FIG. 4A, the input section 404 includes an image selected from an existing search result for a user to define a target composition. The user interface 400 can receive a user input representing a mask layer being applied over at least a portion of the image provided for display in the input section 404. The mask layer may serve to exclude any objects being depicted within the selected portion of the image. The mask layer may be mapped to an object layer indicates one or more adjustments to the first composition of the base layer. The application 222 may generate the object layer, and provide the object layer applied to the base layer as an indication of a target composition. In this respect, the target composition is provided for transmission to the server 130 as part of a new search query or a filter. The server 130 may treat the object layer as a request to initiate a reverse image search or as a filter for an existing search result depending on implementation. As shown in FIG. 4A, the mask layer is applied over a representation of a tree such that images having a composition that excludes the tree are then searched. The image search engine 242 of the server 130 then returns a second search result associated with a reverse image search that may include one or more images with a second composition that closely corresponds to the target composition. The second search result can be provided for display in the output section 406 as illustrated in FIG. 4A.

Figure 4B:
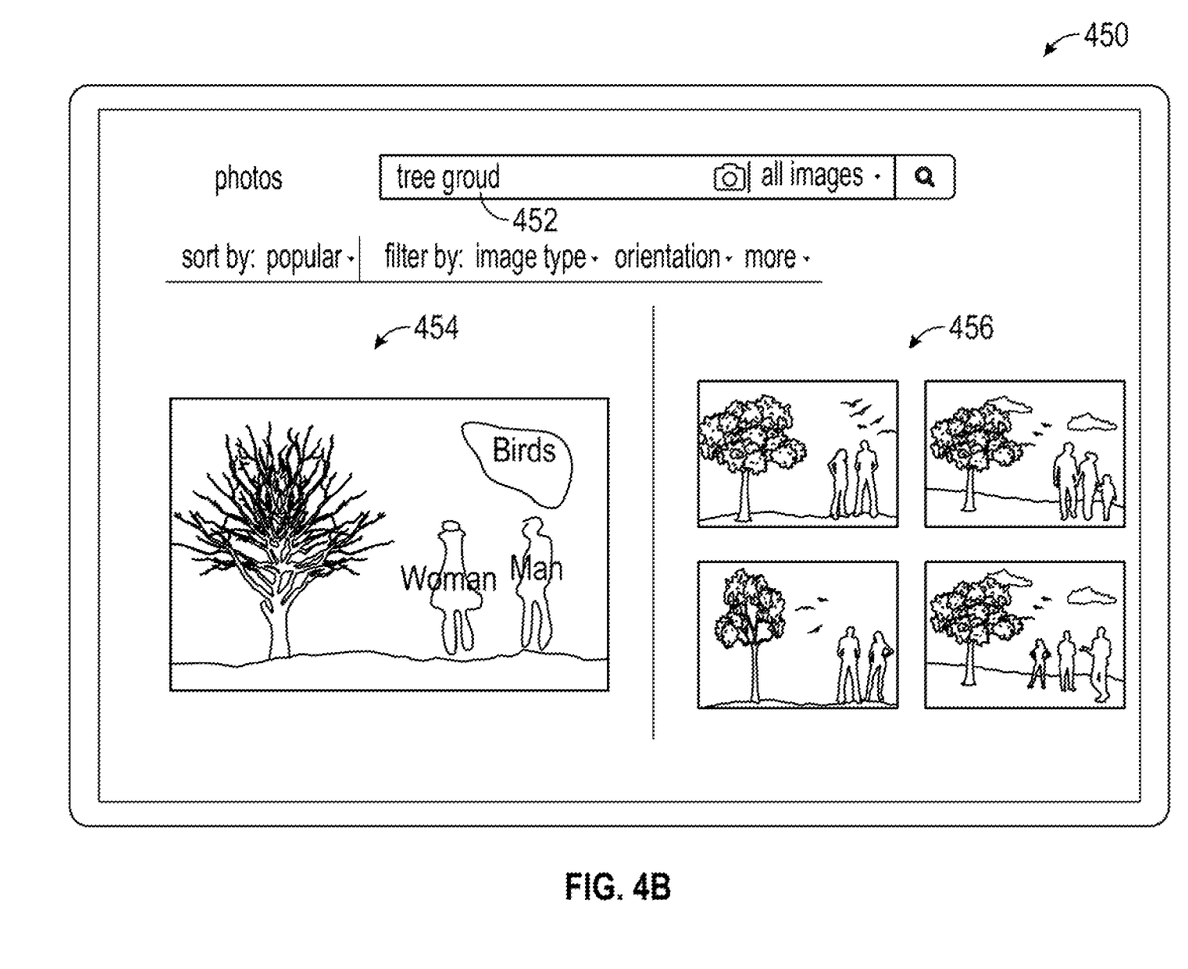

FIG. 4B illustrates an example of a user interface 450 for practicing the example process of FIG. 3 via the application 222 of the client 110. In one or more implementations, the user interface 400 includes an input search query 452 and an input section 404. The processor 236, using the image search engine 242, initiates a forward image search using the vector indicating each of the search terms, and produces a first search result (not shown) that includes an initial listing of images based on the search phrase "tree ground." The first search result can be provided for display on an output section 456 of the user interface 450. In some aspects, each image in the first search result includes a base layer that includes a representation of a first composition for the image. As shown in FIG. 4B, the input section 454 includes an image selected from an existing search result for a user to define a target composition.

The user interface 450 can receive a user input representing one or more foreground objects being applied over at least a portion of the image provided for display in the input section 454. In some aspects, the input section 454 serves as an input drawing canvas, where user-generated drawings and annotations are input to the input drawing canvas 1102 that indicate respective representations of object. The user-generated drawing may be superimposed over an image provided for display in the input section 454. Each of the annotations indicates a respective query term for a corresponding object representation (e.g., tree, bird, woman, man, and ground). In some aspects, the processor 236, using the image search engine 242, feeds the user-generated drawings and annotations through a trained neural language model, and can obtain a vector for each of the representations of "bird", "woman", and "man".

The user-generated drawing can indicate that additional objects are being added to the original image within the selected portion of the image. The added foreground objects by manual drawing may be mapped to the object layer indicating the added objects as adjustments to the first composition of the base layer. In this respect, the added foreground objects (e.g., woman, man, birds) become part of the target composition. As shown in FIG. 4B, the user-generated drawing is applied near a representation of a tree such that images having a composition that includes a woman and man nearby a tree in the foreground and birds in the background are then searched. The image search engine 242 of the server 130 then returns a second search result associated with a reverse image search that may include one or more images with a second composition that closely corresponds to the target composition. The second search result can be provided for display in the output section 456 as illustrated in FIG. 4B.

Hardware Overview

Figure 5:
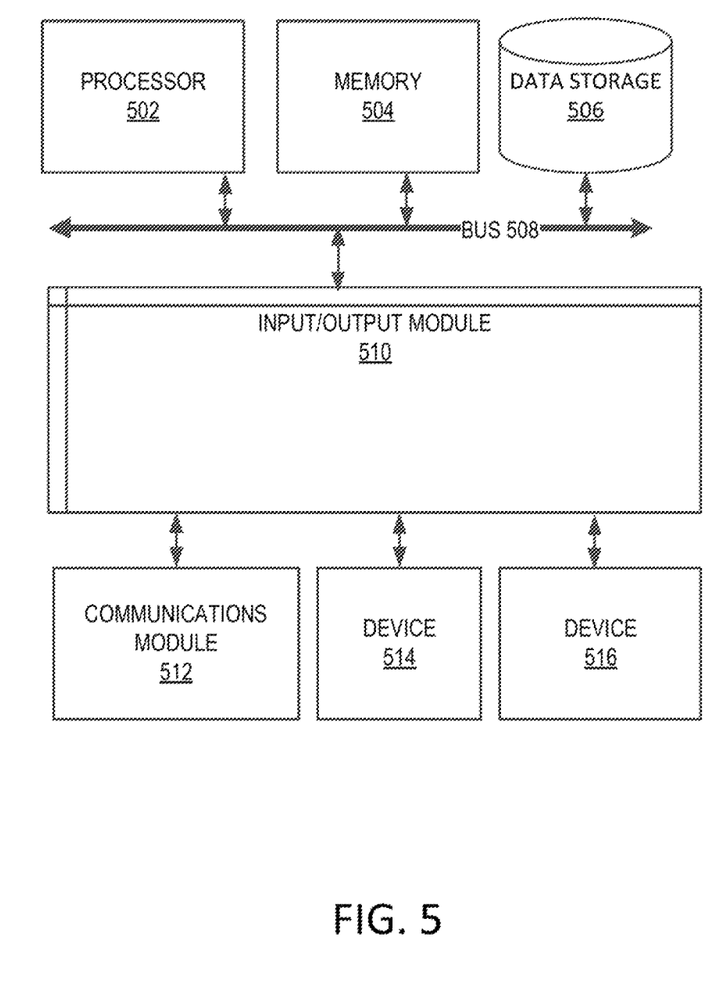
FIG. 5 is a block diagram illustrating an example computer system with which the client and server of FIG. 2 can be implemented.

FIG. 5 is a block diagram illustrating an exemplary computer system 500 with which the client 110 and server 50 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 50) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a LCD (liquid crystal display) monitor, for displaying information to the user.

According to one aspect of the present disclosure, the client 110 and server 50 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, from a client device, first user input identifying a search query for content;
initiating a forward image search responsive to the search query to identify one or more images from a collection of images;
providing a first search result associated with the forward image search to the client device, each image in the first search result comprising a base layer that includes a representation of a first composition for the image;
receiving, from the client device, second user input indicating a target composition, the target composition comprising the base layer of at least one image from the first search result and an object layer that indicates one or more adjustments to the first composition of the base layer, wherein the base layer comprises a first priority and the object layer comprises a second priority different from the first priority;
determining whether the second priority is greater than the first priority;
determining at least one image from the collection of images that has a composition that corresponds more to the object layer than the base layer when it is determined that the second priority is greater than the first priority;
initiating a reverse image search using the target composition; and
providing a second search result associated with the reverse image search, at least one image of the second search result comprising a representation of a second composition that corresponds to the target composition.

2. The computer-implemented method of claim 1, wherein the object layer comprises a representation of a mask layer that obscures at least a portion of the representation of the first composition in the base layer.

3. The computer-implemented method of claim 1, wherein the object layer comprises a representation of one or more objects that overlap at least a portion of the representation of the first composition in the base layer, the representation of the one or more objects being additional content that is added to the at least one image relative to the representation of the first composition in the base layer.

4. The computer-implemented method of claim 1, wherein the object layer comprises a representation of one or more objects of the base layer with an adjustment to one or more properties of the one or more objects.

5. The computer-implemented method of claim 4, wherein the adjustment to the one or more properties comprises modifying a color matrix of the one or more objects.

6. The computer-implemented method of claim 1, wherein the reverse image search is based on a priority of the base layer relative to a priority of the object layer.

7. The computer-implemented method of claim 1, wherein the target composition is defined by a second object layer that indicates one or more content adjustments different from the object layer.

8. The computer-implemented method of claim 7, wherein the object layer comprises a representation of one or more objects being added relative to the base layer and the second object layer comprises a representation of a mask layer that obscures at least a portion of the representation of the first composition in the base layer.

9. The computer-implemented method of claim 8, wherein the base layer comprises a first priority, the object layer comprises a second priority, and the second object layer comprises a third priority, wherein the second priority and the third priority are respectively greater than the first priority, and wherein the third priority is different from the second priority.

10. The computer-implemented method of claim 9, further comprising:
    determining whether the third priority is greater than the second priority;
    determining at least one image from the collection of images that has a composition that corresponds more to the second object layer than the object layer when it is determined that the third priority is greater than the second priority; and
    determining at least one image from the collection of images that has a composition that corresponds more to the object layer than the second object layer when it is determined that the third priority is not greater than the second priority.

11. The computer-implemented method of claim 1, further comprising:
    determining at least one image from the collection of images that has a composition that corresponds more to the base layer than the object layer when it is determined that the second priority is not greater than the first priority.

12. A system comprising:
    one or more processors;
    a computer-readable storage medium coupled to the one or more processors, the computer-readable storage medium including instructions that, when executed by the one or more processors, cause the one or more processors to:
        generate a first search result associated with a forward image search, the first search result comprising a first listing of images that is responsive to a search query from a client device, each image in the first listing of images respectively comprising a base layer that comprises a representation of a first composition for the image;
        receive, from the client device, user input indicating a target composition, the target composition being defined by the base layer of at least one image from the first search result and an object layer that indicates one or more adjustments to the first composition of the base layer, wherein the base layer comprises a first priority and the object layer comprises a second priority different from the first priority;
        determine whether the second priority is greater than the first priority;
        determine at least one image from the collection of images that has a composition that corresponds more to the object layer than the base layer when it is determined that the second priority is greater than the first priority;
        generate a second search result using the target composition, the second search result comprising one or more second images that respectively include a representation of a second composition that corresponds to the target composition; and
        provide the second search result to the client device.

13. The system of claim 12, wherein the instructions cause the one or more processors to:
    filter the first search result using the base layer and the object layer of the at least one image from the first listing of images.

14. The system of claim 12, wherein the instructions cause the one or more processors to:
    modify one or more properties of an existing image in the first search result using the object layer of the least one image from the first listing of images.

15. The system of claim 14, wherein the instructions cause the one or more processors to:
    modifying a color matrix of one or more objects in the base layer of the at least one image from the first listing of images.

16. The system of claim 14, wherein the instructions cause the one or more processors to:
    determine that the target composition adds one or more objects to the first composition based on a representation of the one or more objects in the object layer relative to the base layer; and
    initiate a reverse image search based on the target composition.

17. The system of claim 14, wherein the instructions cause the one or more processors to:
    determine that the target composition excludes one or more objects from the first composition based on a representation of a mask layer in the object layer relative to the base layer; and
    initiate a reverse image search based on the target composition.

18. The system of claim 12, wherein the instructions further cause the one or more processors to:
    initiate, in response to receiving the user input, a reverse image search,
    wherein the reverse image search is based on a priority of the base layer relative to a priority of the object layer.

19. A computer-implemented method, comprising:
    receiving user input via an application on a client device to initiate a forward image search;
    generating, in response to the received user input, a first search query for one or more images;
    providing for transmission the search query over a connection to a server;
    receiving a first search result associated with the forward image search from the server, the first search result being obtained by an image search service of the server responsive to the first search query, each image in the first search result comprising a base layer that comprises a representation of a first composition for the image;
providing for transmission an indication of a target composition over the connection to the server, the target composition being defined by the base layer of at least one image from the first search result and an object layer that indicates one or more adjustments to the first composition of the base layer, wherein the base layer comprises a first priority and the object layer comprises a second priority different from the first priority;
determining whether the second priority is greater than the first priority;
determining at least one image from the collection of images that has a composition that corresponds more to the object layer than the base layer when it is determined that the second priority is greater than the first priority; and
receiving a second search result associated with a reverse image search from the server, at least one image of the second search result comprising a representation of a second composition that corresponds to the target composition.

\* \* \* \* \*